US008502822B2

(12) United States Patent
Rabin

(10) Patent No.: US 8,502,822 B2
(45) Date of Patent: Aug. 6, 2013

(54) METHOD AND APPARATUS FOR VISUALIZING AND INTERACTIVELY MANIPULATING PROFILE DATA

(75) Inventor: Steve Rabin, Bothell, WA (US)

(73) Assignee: Nintendo Co., Ltd., Kyoto (JP)

(*) Notice: Subject to any disclaimer, the term of this patent is extended or adjusted under 35 U.S.C. 154(b) by 988 days.

(21) Appl. No.: 12/534,048

(22) Filed: Jul. 31, 2009

(65) Prior Publication Data

US 2010/0079463 A1 Apr. 1, 2010

Related U.S. Application Data

(60) Provisional application No. 61/170,509, filed on Apr. 17, 2009, provisional application No. 61/101,164, filed on Sep. 30, 2008.

(51) Int. Cl.
*G06T 11/20* (2006.01)
*G06T 11/40* (2006.01)
*G09G 5/20* (2006.01)

(52) U.S. Cl.
CPC .............. *G06T 11/206* (2013.01); *G06T 11/203* (2013.01); *G06T 11/40* (2013.01); *G09G 5/20* (2013.01)
USPC ...................... 345/440; 345/440.1; 345/440.2; 345/441; 345/442; 345/443

(58) Field of Classification Search
CPC ..... G06T 11/206; G06T 11/203; G06T 11/40; G09G 5/20
USPC ......... 345/440–442; 717/133, 158; 715/700
See application file for complete search history.

(56) References Cited

U.S. PATENT DOCUMENTS

| 5,212,794 | A | 5/1993 | Pettis et al. |
| 5,355,487 | A | 10/1994 | Keller et al. |
| 6,718,286 | B2 | 4/2004 | Rivin et al. |
| 7,079,993 | B2 | 7/2006 | Stephenson et al. |
| 7,587,709 | B2 | 9/2009 | Chilimbi et al. |
| 7,730,460 | B1* | 6/2010 | Warren et al. ............... 717/133 |
| 8,051,410 | B2 | 11/2011 | Marfatia et al. |
| 2003/0171907 | A1* | 9/2003 | Gal-On et al. ............... 703/14 |
| 2005/0200627 | A1* | 9/2005 | Desylva ....................... 345/520 |
| 2006/0242636 | A1* | 10/2006 | Chilimbi et al. ............ 717/158 |
| 2007/0006173 | A1 | 1/2007 | Sohm et al. |
| 2008/0120543 | A1* | 5/2008 | Cahill et al. ................. 715/700 |
| 2008/0127149 | A1* | 5/2008 | Kosche et al. .............. 717/158 |
| 2008/0170073 | A1* | 7/2008 | Ono et al. .................... 345/440.1 |
| 2009/0147006 | A1* | 6/2009 | Buck et al. .................. 345/440.2 |

OTHER PUBLICATIONS

Steve Rabin et al., Wii Profiler—1_1-20071008, Wii Profiler v1.1—Sampling Profiler for Nintendo Wii (8 pages), Oct. 8, 2007.
Steve Rabin et al., Wii Profiler—1_0-070423, Wii Profiler v1.0—Sampling Profiler for Nintendo Wii (6 pages), Apr. 23, 2007.

(Continued)

*Primary Examiner* — Jin-Cheng Wang
(74) *Attorney, Agent, or Firm* — Nixon & Vanderhye P.C.

(57) ABSTRACT

Profile data collected through sampling is transformed and visually and interactively manipulated and displayed. In one scenario, the profile data is collected through statistical profiling of a program for a video game. The game program profile data is visually and interactively manipulated and displayed to visually present a dynamic behavior of the video game that shows correlation of impacts that the functions of the program have on the video game's performance. This allows the developer to identify inefficient sections of the program for optimization.

40 Claims, 18 Drawing Sheets

OTHER PUBLICATIONS

Steve Rabin et al., Wii Profiler—2_0-20080418, Wii Profiler v2.0—Sampling Profiler for Nintendo Wii (11 pages), Apr. 18, 2008.

Stephen G. Eick et al., "Visualizing Code Profiling Line Oriented Statistics", AT&T Bell Laboratories, 1992, pp. 210-217.

Priya Nagpurkar et al., "Efficient Remote Profiling for Resource-Constrained Devices", ACM Transactions on Architecture and Code Optimization, vol. 3, No. 1, Mar. 2006, pp. 35-66.

Steve Rabin, Wii Profiler v2.0, Wii Summit 2008, Powerpoint slides (60 pages), Apr. 11, 2008.

Office Action mailed Dec. 12, 2012 in related U.S. Appl. No. 12/533,845 (14 pages).

Office Action mailed Apr. 12, 2013 in related U.S. Appl. No. 12/533,845 (11 pages).

* cited by examiner

METHOD AND APPARATUS FOR VISUALIZING AND INTERACTIVELY MANIPULATING PROFILE DATA

CROSS-REFERENCES TO RELATED APPLICATIONS

The application claims the benefit of U.S. provisional patent application 61/170,509 entitled "METHOD AND APPARATUS FOR VISUALIZING AND INTERACTIVELY MANIPULATING PROFILE DATA" filed Apr. 17, 2009, which in turns claims priority to U.S. provisional patent application 61/101,164 entitled "METHOD AND APPARATUS FOR EFFICIENT STATISTICAL PROFILING OF VIDEO GAME AND SIMULATION SOFTWARE" filed Sep. 30, 2008, both of which are incorporated herein by reference in their entirety.

TECHNICAL FIELD

The technology described herein relates to visualizing and interactively manipulating profile data, which may be generated based on performance measurements from computing devices including but not limited to video game programs.

BACKGROUND AND SUMMARY

In general, profiling is a way to analyze dynamic behavior of a computer program, e.g., for optimizing its performance or finding bugs or other problems. Profiling results can be used, e.g., to identify inefficient sections of programs, which can then be modified to operate faster or more optimally.

For accurate analysis, large amounts of profiling data should be gathered. Statistical profiling is one common approach to gather large amounts of data. In statistical profiling, the execution of the computer program is periodically stopped (e.g., based on a timer) to sample where the program is in its execution at that particular instant. By sampling thousands or millions of times, a statistically accurate view of the program execution can be reconstructed.

Typically, the profile data also referred to as "sampled data" or "statistical data" is processed for analysis and the analysis results are textually presented in a format that includes tables along with descriptive text. Such textual presentation can yield valuable information. However, such textual presentation can be limited in its ability to easily provide comprehensive views of the analysis. Information pieces often are presented individually and disconnected from each other, and the user is often left with the task of relating the presented pieces of information to one other.

Therefore, it desirable to visually and interactively manipulate profile data, including data based on measurements from computing devices such as video games, so that the analyzed information pieces may be displayed graphically in a way that correlates the data so that a comprehensive view is presented. To put it another way, it is desirable to transform the profile data so that the profile data can be visualized. The user, e.g., software developer, can receive accurate feedback allowing him or her to quickly determine potential areas of interest, e.g., functions, for further detailed analysis and for optimization opportunities.

An illustrative non-limiting implementation herein uses a technique in which detailed graphs of functions, i.e., function graphs, of a video game program based on the profile data of the program are graphically displayed and visually correlated to a list of functions, each of which is user selectable. This technique can visually and interactively manipulate the profile data so that the analyzed information pieces can be presented in ways that correlate to visually present a dynamic behavior of the video game program. As a non-limiting example, the correlation of impacts that individual functions have on the performance of the executing video game program can be presented visually.

Illustrative non-limiting method and apparatus for visually and interactively manipulating the profile data display a list of one or more functions of a video game program in a Functions List window. Each function in the Functions List window is selectable. For each selected function, a large-scale detailed graph, or simply "function graph", of the selected function is displayed in a Function Graph window. The function graph includes a data line, which represents a graph of instantaneous performance of the function, and a highlight band which tracks the data line. A thickness of the highlight band represents a margin of error of the selected function. The highlight band is visually correlated to the selected function in the Functions List window.

A non-exhaustive list of non-limiting features include:
- A list of all functions for which data is gathered is displayed in the Functions List window, each with a mini-graph of its performance over the duration of the profile data gathering. Each mini-graph effectively communicates many data points in a very small footprint, and emphasizes variation at low values and while still visualizing larger values. The mini-graphs offer a preview of the functions allowing the user to quickly determine which function or functions may be of interest.
- The user can interactively select one or more functions from the Functions List window for display as detailed function graphs of performance in the Function Graph window, one for each selected function. Each function graph is displayed as combination of a data line loosely followed by a thicker highlight band. The data line is a graph of the function's instantaneous performance values. The thickness of the highlight band indicates the function's margin of error.
- Color and/or pattern of each highlight band visually correlates the function being graphed with the selected function in the Functions List window.
- Each highlight band follows a moving average or some other moving statistical representation of the function's data line. Smoothing is applied to the highlight band to minimize noise. Where the data line abruptly changes, the highlight band follows the data line very closely or even exactly so that the highlight band is on the data line. The smoothed highlight band improves the overall readability of the graph.
- Within the Function Graph window, non-uniform scaling is permitted, e.g. zooming on the X-axis only.
- Within each zoom level, the analyzer graphically displays statistical attributes such as range, average, median, etc. for the portion of the data line currently being displayed within the Function Graph window.
- The analyzer displays a graph related to instantaneous frame rate of the video game in a Frame Rate Graph window that corresponds 1:1 in time with the function graphs displayed in the Function Graph window. The graph of the instantaneous frame rate—which is a non-limiting example measure of the video game's performance—graphically depicts coincidences between the performance of any particular function and decrease/increase in the overall frame rate.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 1:
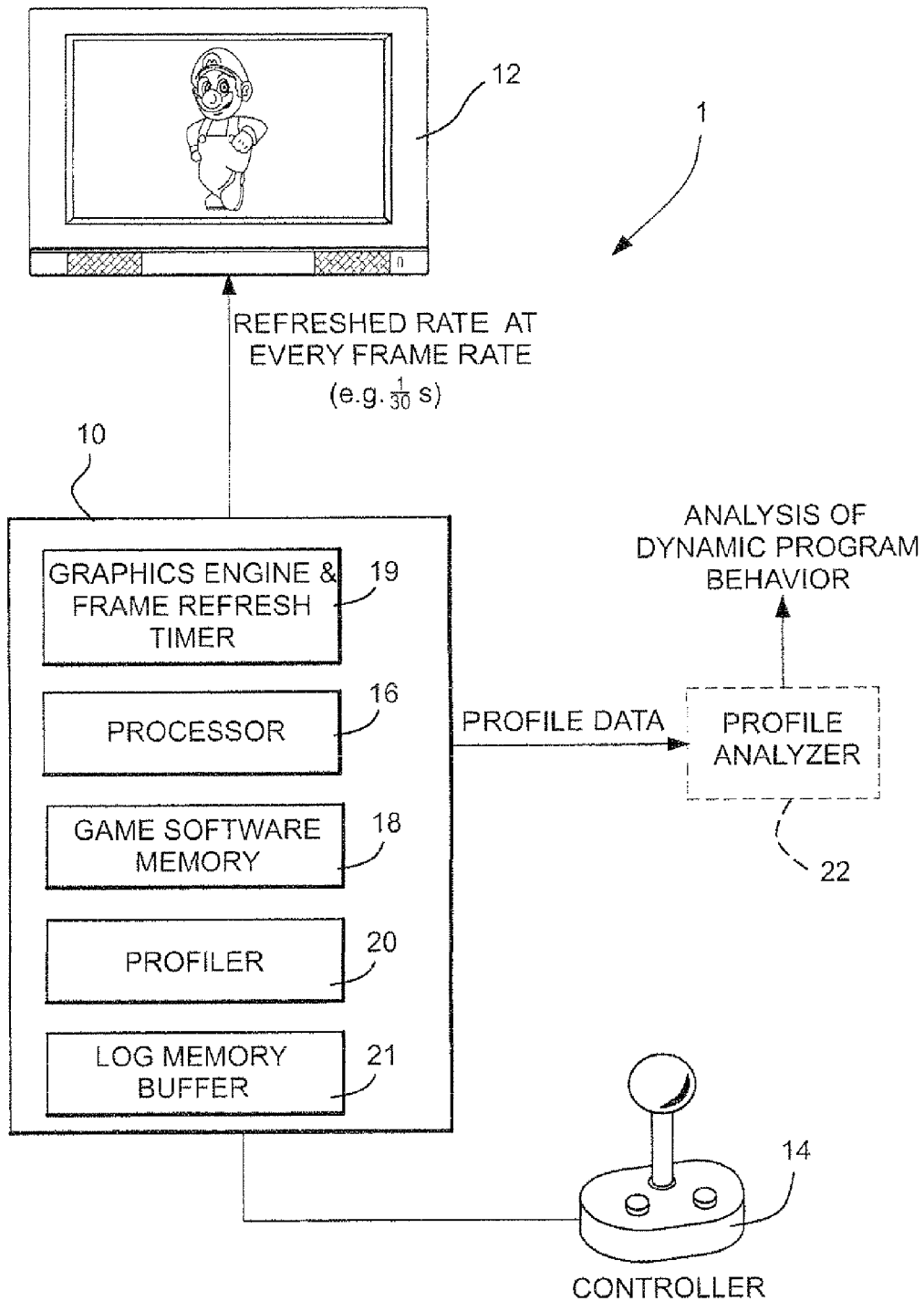
FIG. 1 is a block diagram showing an illustrative non-limiting implementation of a profiling system.

FIG. 1 shows in a block diagram form an illustrative non-limiting software development system 1 for a video game system, which can be, e.g., an embedded computing device. The software development system 1 includes a computing system 10 connected to a display 12 and a hand-held controller 14. The computing system 10 includes a processor 16, which executes a video game program stored in a game software memory 18 and includes a graphics engine 19 that generates graphics for display on the display 12. The graphics engine 19 includes a frame buffer memory that composes images periodically (e.g., every $1/30^{th}$ or $1/60^{th}$ of a second) and reads out the images for display on the display 12. Frame refresh rate may be controlled by a frame refresh timer 19 that interrupts the processor 16 periodically or non-periodically.

The computing system 10 further includes a profiler 20 used in gathering the program execution data when the processor 16 executes the game program. The profiler 20 can be implemented in any combination of software, hardware, and firmware, in one non-limiting illustrative embodiment, the profiler 20 is a statistical profiler that monitors a sequence of operations performed by the processor 16 while it executes the game program. The profiler 20 non-intrusively samples the processor 16 program executions at a rate and at timings that are responsive to the frame refresh rates. The profiler 20 produces statistical data, e.g., profile data, which may specify various functions that are called during the execution of the game program, and their addresses, which in turn indicate where in the memory program the instructions are stored, as well as count of times particular functions are called. The profiler 20 stores the collected data in a log memory buffer 21.

The software development system 1 also includes a profile analyzer 22 which receives the profile data from the log memory 21, and analyzes the dynamic program behavior of the video game program based on the profile data. Analysis can be used by a software developer to identify which functions of the program are consuming the majority of the processor 16 resources to subsequently optimize the structure of such functions. From one perspective, the analyzer 22 can be said to transform the profile data to be visually displayed so that the developer can quickly determine which functions are of interest for further analysis and optimization.

Figure 2:
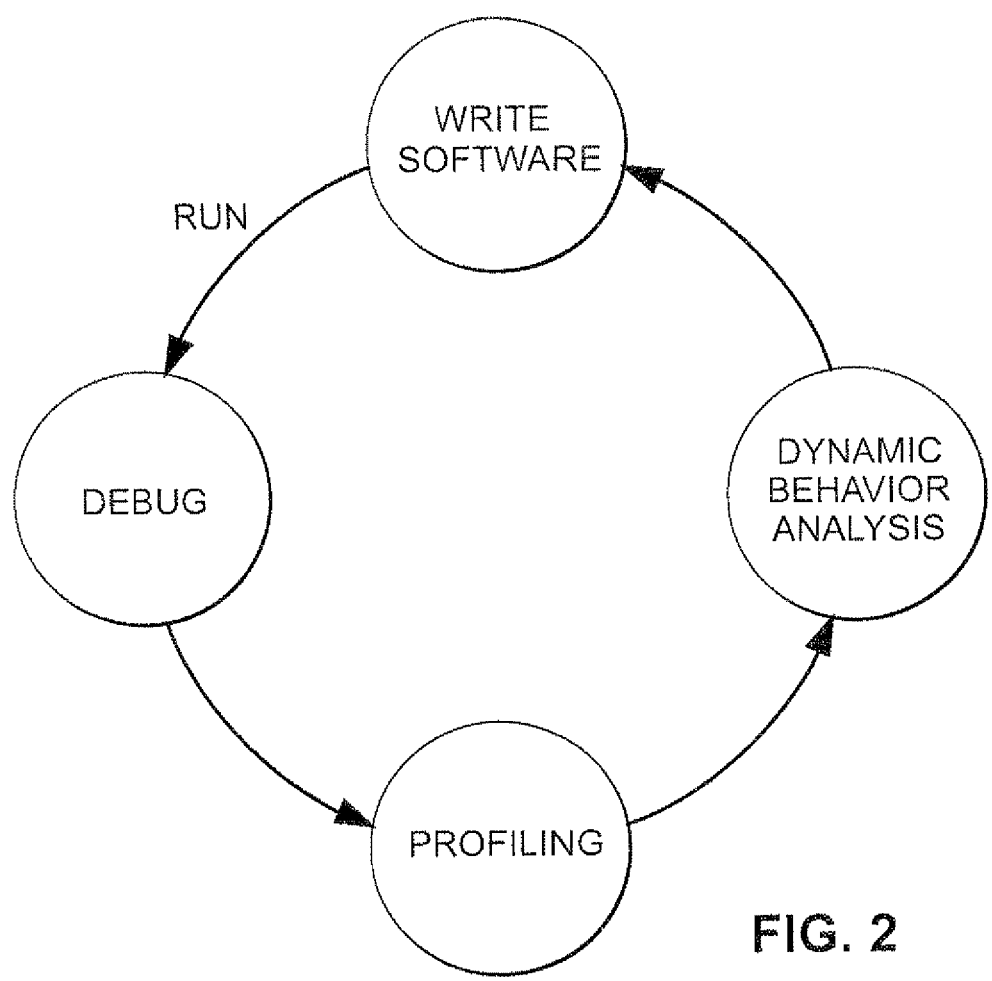
FIG. 2 is a diagram showing a sequence of steps for analyzing a computer software program according to an illustrative non-limiting implementation.

FIG. 2 depicts an illustrative non-limiting sequence of activities performed in developing software using such profiler analysis. The developer writes a program, which is executed in the computer system 10. To look for errors in the software program (an activity referred to as "debugging") or for other purposes, execution of the software code is effected using profiling. Results of the profiling offer a picture of the dynamic behavior of the program during its execution. Based on this analysis, the developer is in a better position to modify the software so that its dynamic operation is optimized. As shown, these activities can be performed iteratively.

To allow dynamic behavior analysis, the profile data can be transformed and displayed visually to the software developer. As noted, the profile data for visual display and manipulation can be gathered through many ways including statistical profiling. To illustrate, a non-limiting illustrative example of statistical profiling for data gathering is described.

Typically, a media processing system, such as a video game console or a real-time simulation system forms an image or picture on a display by generating the image one line or frame at a time. A scanning circuit retraces to a left edge of display and then starts scanning the line. Starting at a top of the display, all lines of the display are scanned in this way. One complete set of lines makes a picture of image, which is referred to as a frame. Once the frame is completed, the scanning circuit retraces to top of display and starts scanning the next frame. This process can be repeated so fast that the human eye blends succeeding frames together and the displayed images are perceived to have a continuous motion. Typically, rate of 30 frames per second (fps) is sufficient for images to be perceived as having continuous motion. Some systems can have very high rates such as 60 fps.

Whatever the frame rate, it is desirable to generate the profiling data that represents a statistically accurate view of the true program behavior. In one illustrative non-limiting implementation, the profiler 20 generates the profile data by sampling at fixed points within each frame. In another non-limiting implementation, the sampling rate is fixed (interval between successive sample points is substantially constant) from one frame to another, but the starting sampling point is randomized for each frame.

While statistical profiling is effective, it is not the only way that the profile data can be gathered. Indeed, the way in which the data is gathered is not important as long as sufficient data samples are gathered so that a meaningful analysis can be performed. Another non-limiting illustrative approach to gather profiling data samples is the instrumenting approach. Unlike the statistical approach, an instrumenting profiler 20 can alter the computer program (or "instruments" it) with additional instructions that report back or log each time each function of interest is entered and exited. The log data from the instrumented commands can be collected when the program is run, which then can be analyzed and visually and interactively manipulated by the analyzer 22.

Figure 3:
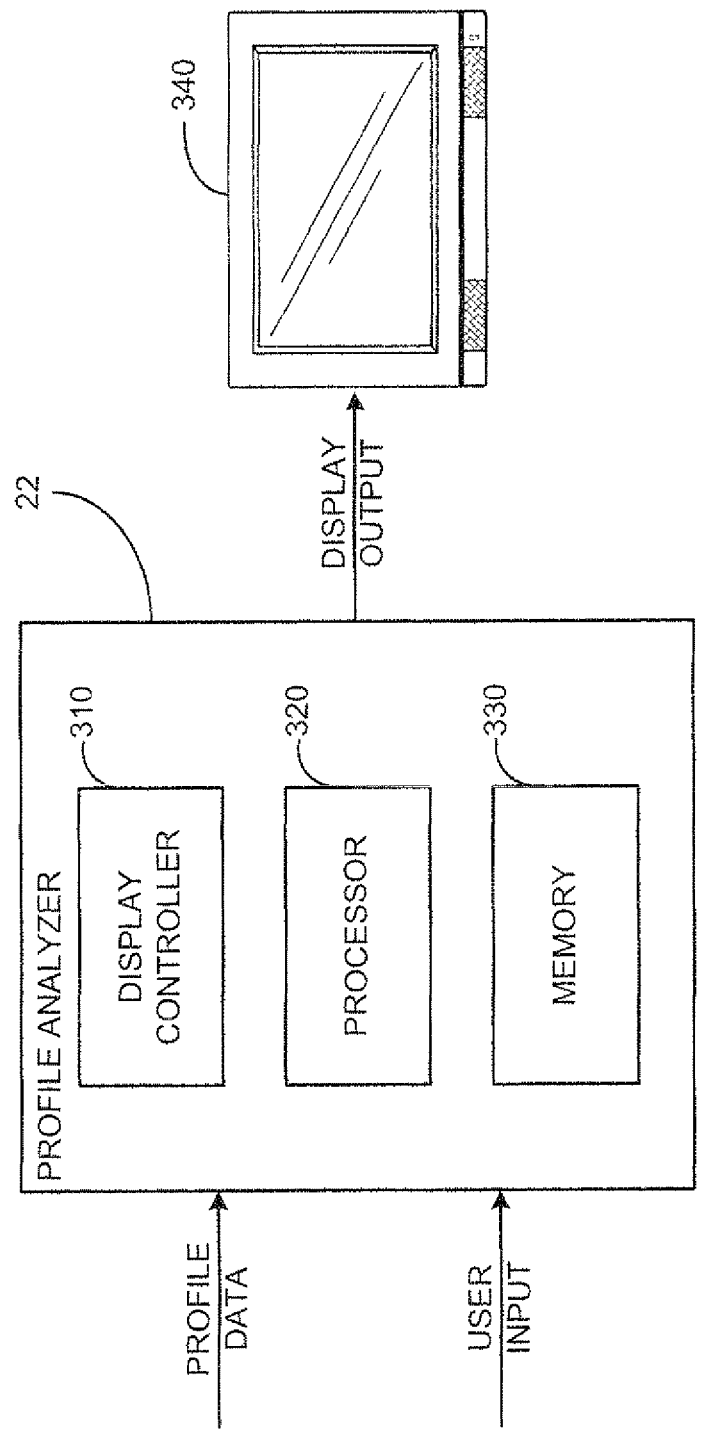
FIG. 3 shows an illustrative non-limiting implementation of a profile analyzer outputting a graphical output.

FIG. 3 shows an illustrative non-limiting implementation of the profile analyzer 22 which visually displays the profile data to the developer. The analyzer 22 includes a display controller 310, a processor 320, and a memory 330. The processor 320, in conjunction with the display controller 310 and the memory 330, performs operations to process the profile data. The display controller 310 controls a display device 340 to display the processing results. The memory 330, which can be in any combination of RAM, ROM, non-volatile storage, stores data and programs necessary for the analyzer 22 to operate. The profile data from the computing system 10 is received and stored in the memory 330.

The analyzer 22 may be implemented in any combination of hardware, software and firmware. In one non-limiting illustrative embodiment, the analyzer 22 may be a general computing device in which the processor 320 executes an analyzer software code stored in the memory 330. The analyzer software code can be provided in a computer readable medium including, but not limited to, CD, DVD, USB memory, flash memory, SD card, etc. In another non-limiting illustrative embodiment, the analyzer 22 may be a dedicated device operable in a stand-alone fashion or connectible to a general computing device. No matter the form, the analyzer 22 analyzes and transforms the profile data and outputs graphical display of the transformed data.

Figure 4:
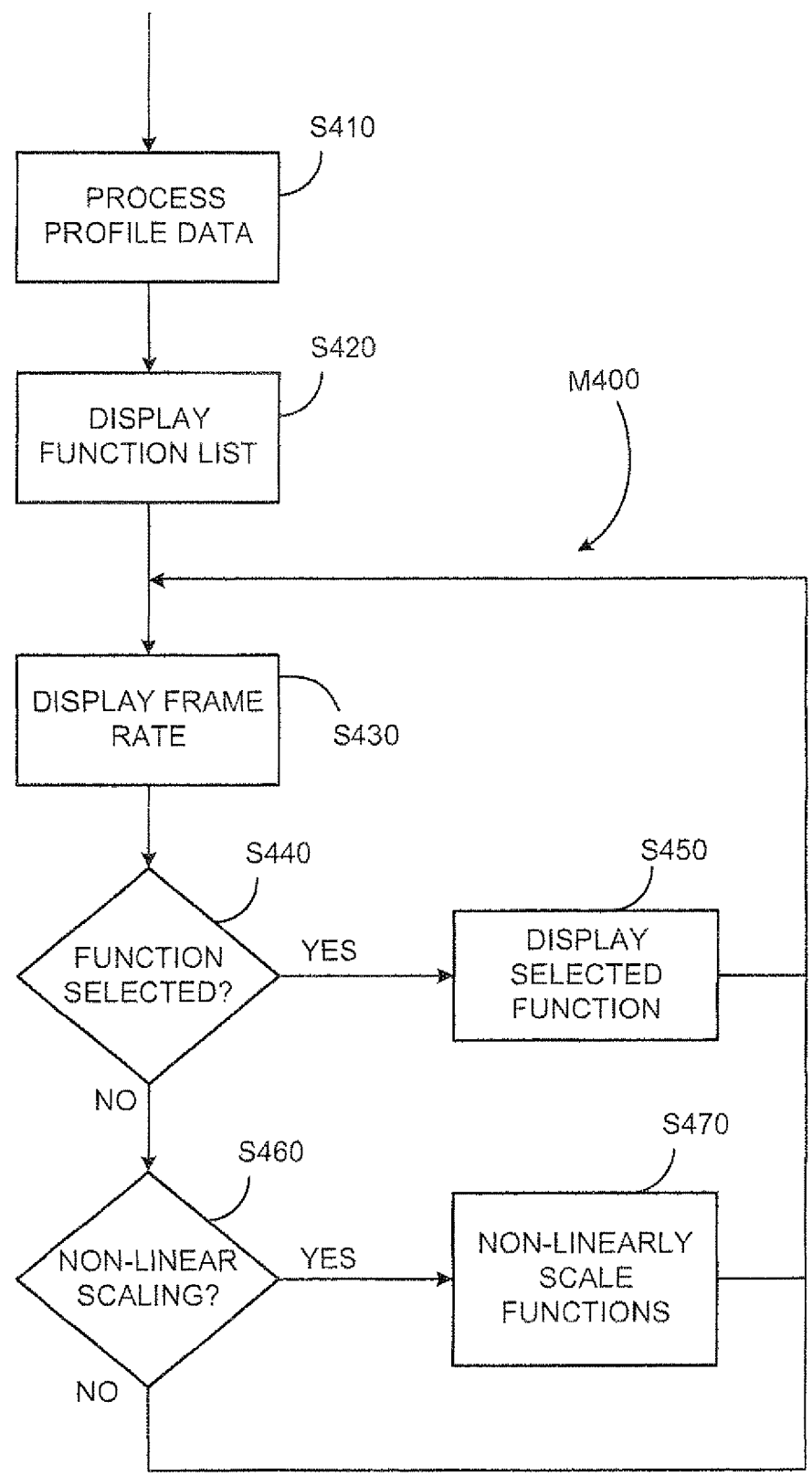
FIG. 4 shows an illustrative non-limiting method of visually and interactively manipulating the profile data based on performance measurements from the program.

FIG. 4 shows an illustrative non-limiting method M400 to visually and interactively manipulate the profile data. For the purposes of illustration, the profile data in this instance is assumed to be generated by the profiler 20 of the computing system 10 by statistically profiling the video game program. That is, the profile data includes performance measurements of functions of the game program as the program executes. In this particular non-limiting method, performance of the function is measured as a percentage of a frame time spent executing the function, and the performance of the video game is measured in instantaneous frame rate.

In the method shown, the processor 320 receives the profile data, e.g., from the computer system 10, in step S410. The processor 320 stores the profile data in memory 330. In step S420, the display controller 310 displays a list of one or more functions of the video game program. In step S430, the display controller 310 displays the frame rate. When an input is received indicating that a function is selected in step S440, the display controller 310 displays the function graph of the selected function in step S450. When an input is received to non-linearly scale the display in step S460, the processor 320 performs the non-linear scaling and the display controller 320 displays the non-linear scaling result in step S470.

Figure 5:
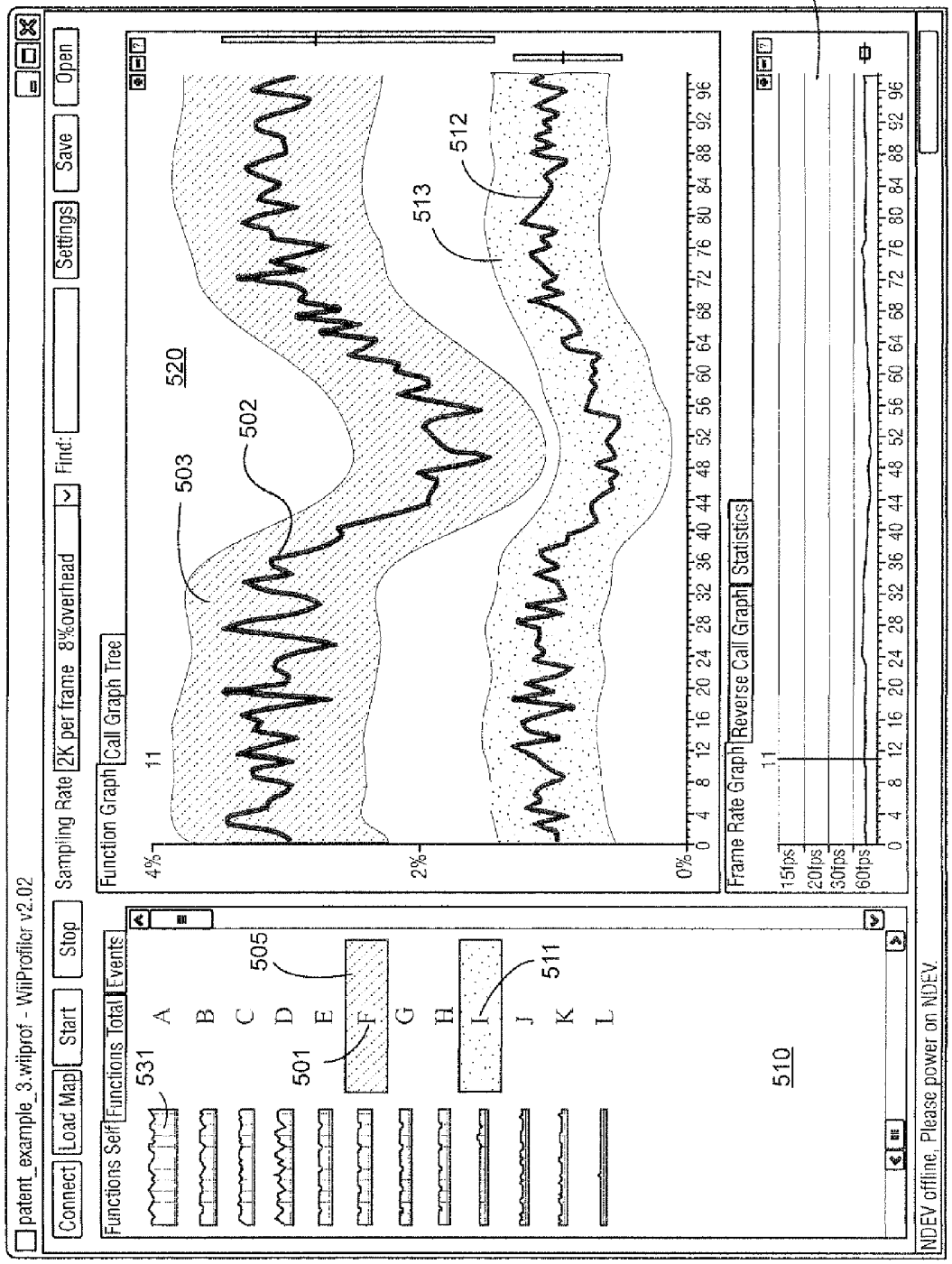
FIG. 5 shows an illustrative non-limiting example display that includes the Functions List window, the Function Graph window, and the Frame Rate Graph window.

In these steps, the display controller 310, in conjunction with the processor 320, controls the display device 340 to display the transformed profile data. FIG. 5 shows a non-limiting illustrative example of a visual display of the transformed graphical information on the display device 340. The display includes a Functions List window 510, a Function Graph window 520, and a Frame Rate Graph window 530. Each of the steps S420-S470 is explained in more detail below.

Figure 6:
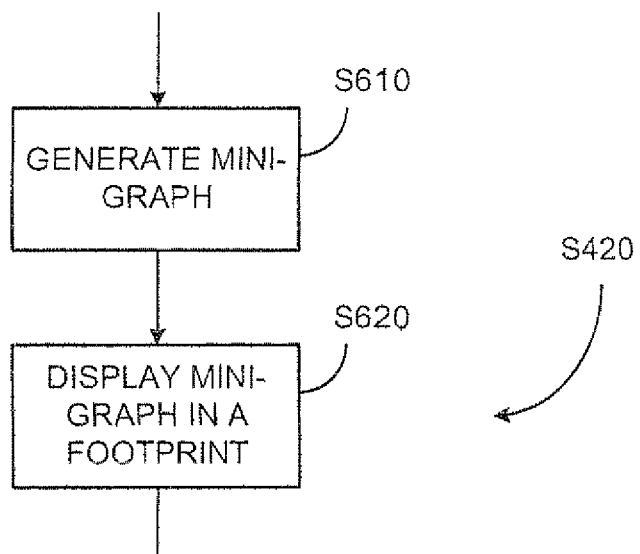
FIG. 6 shows an illustrative non-limiting method of generating and displaying the mini-graphs.

Referring back to FIG. 4, in step S420, the display controller 310 displays a list of one or more functions of the video game program in the Functions List window 510. Each function listed in the Functions List window 510 is user selectable. FIG. 6 shows a non-limiting illustrative example method to perform step S420 of displaying the functions of the video game program in the Functions List window 510. In the method, the processor 320 generates a mini-graph for each function in step S610, and the display controller 310 controls the display device 340 to display the mini-graphs in step S620.

As shown in FIG. 5, for functions "A", "B", "C", and so on, a corresponding mini-graph 531 is displayed next to the function. Each mini-graph provides a preview of the function's performance over the duration of the profile data. The mini-graph occupies a very small footprint, e.g., 50 pixels wide and 10 pixels tall, but can yet present enough information to allow the developer to easily scan the list for any interesting functions to graph in detail. Without the mini-graphs, the developer would be forced to select each function individually to even determine if the function warrants more detailed view, which can be very cumbersome.

Figure 7:
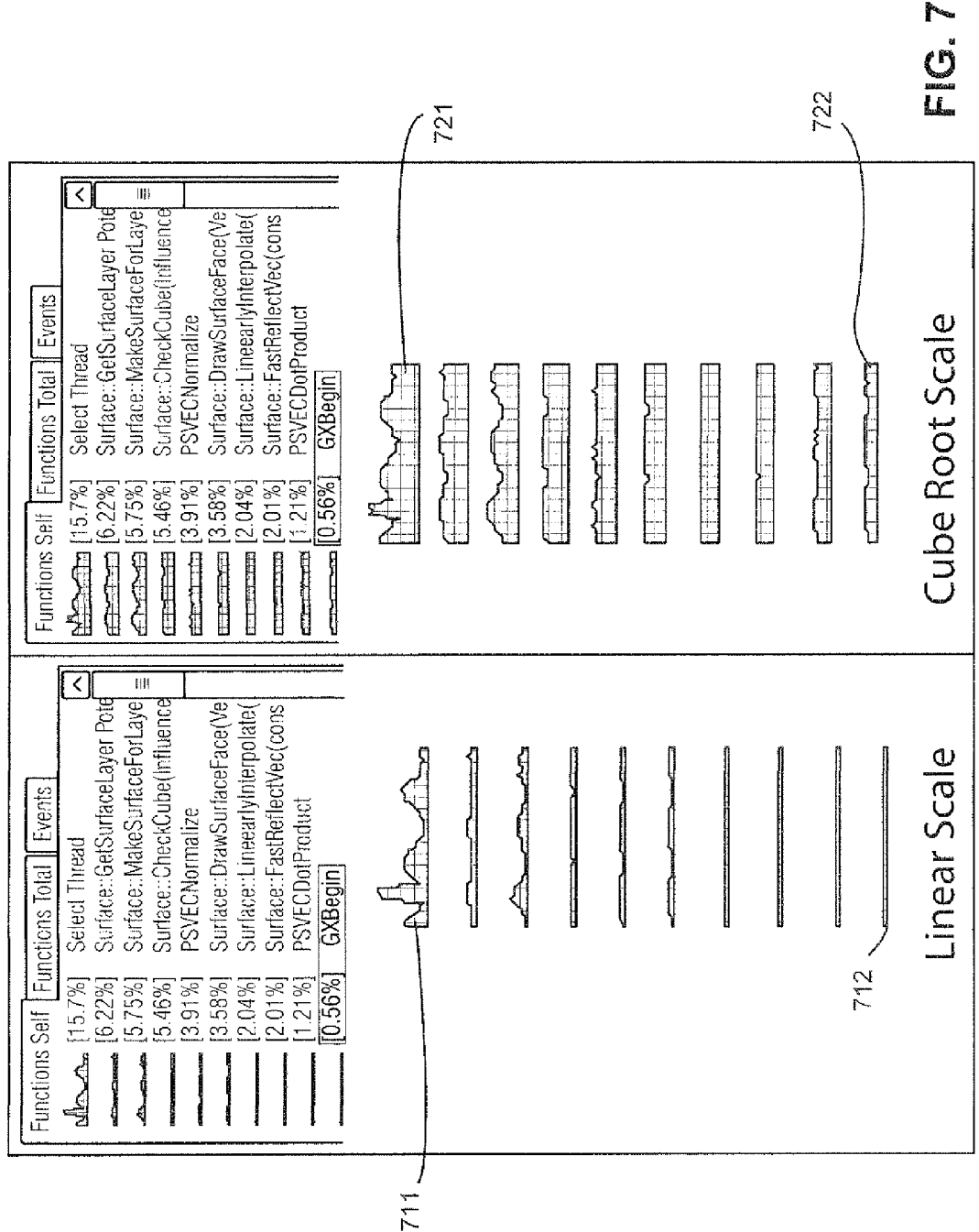
FIG. 7 shows an illustrative non-limiting comparison between linearly scaled mini-graphs and exponentially scaled mini-graphs.

While linear scaling of the mini-graphs is permitted, it is preferred to generate the mini-graphs using exponential scaling. Due to the limited footprint, variations at low performance values are difficult to visualize with linear scaling. Exponential scaling—such as square root, cubed root, etc.—allows the low performance variations to be emphasized while still enabling larger performance values to be visualized. In this way, more information can be presented in the small footprint. In a non-limiting illustrative example, an exponential function is used for scaling as shown in FIG. 7. On the left half of FIG. 7, the mini-graphs are drawn in a linear scale. On the right half of the figure, the same graphs are drawn in a cubed root scale. In comparison, it is seen that the exponential scaling allows low values to be emphasized (compare mini-graphs 712 and 722). At the same time, larger performance values are still visualized (compare mini-graphs 711 and 721). When exponential scaling is applied, spikes—sudden or abrupt changes—in the function can be more easily visualized.

Further, the mini-graphs can be sorted based on a performance measurement such as a percentage of execution time spent in a function. In FIG. 7, on top of both left and right halves of the figure, a percentage is associated with each function. For example, it is seen that on average, 15.7% of a frame time was spent in the function "SelectThread". If the frame rate is 30 Hz, then the amount of time spent in the SelectThread function is roughly 5.23 ms (each frame duration is about 33.3 ms) for each frame. When sorted as such, the most significant functions—the functions in which a majority of time is spent executing—are displayed at the top. This enables the user to quickly identify which functions could be optimized for greatest impact. The function's percentages, i.e., the function's performance measurements, which can be included in the Function List window 510, are not drawn in other figures so as to more easily draw attention to other aspects of the disclosure.

Referring back to FIGS. 4 and 5, note that each function listed in the Functions List window 510 is selectable for a detailed view. When the user selects a function in step S440, the processor 320 generates and the display controller 310 displays a corresponding function graph of the selected function in the Function Graph window 520 in step S450. As shown in FIG. 5 for example, two functions "F" 501 and "I" 511 are selected. In the Function Graph window 520, function graphs are drawn for the selected functions. The function graphs include data lines 502, 512 and highlight bands 503, 513 corresponding to the selected functions 501, 511.

The data lines 502, 512 each represent a graph of instantaneous performances of the selected functions 501, 511. In this particular implementation, the data lines are graphs of the data values of the functions in the profile data. In this non-limiting example, the X-axis of the Function Graph window 520 is the frame number and the Y-axis is the percentage of the frame time (e.g., of a 30 Hz frame). Thus, the data lines 502, 512 indicate the percentage of the frame time spent executing functions "F" and "I" at each frame. As concrete example, during frame 12, roughly 3% and 1% of the frame time is spent executing functions 501 and 511, respectively. These performance values drop to roughly 1.5% and 0.75%, respectively, during frame 50.

The highlight bands 503, 513 which surround the data lines generally track the data lines 502, 512. The thickness of each highlight band 503, 513 represents a margin of error of the selected function 501, 511. Most sampled data, such as the profile data, has a margin of error associated therewith. Thus, the function's data values (percentages of each frame time) can be expected to lie somewhere within a bell-shaped curve. In this non-limiting illustration, the width of each highlight band 503, 513 conveys this margin of error. For example, the width can represent an area within a predetermined range such as within three standard deviations.

Note that the margin of error can differ between functions—the widths of the highlight bands can differ for each data line. For example, the highlight band 503 is wider than the highlight band 513 indicating that the function 501 has a greater variability (larger standard of deviation) than the function 511. This extra information enables better understanding of the variability of the functions. Thus, highlight bands visually display the trustworthiness of the measured data for the functions.

Note also that each highlight band 503, 513 is visually correlated with the selected function 501, 511. In this particular example, the patterns of the highlight bands 503, 513 in the Function Graph window 520 match the patterns of the functions 501, 511 in the Functions List window 510. Visual correlation can be accomplished in other ways. For example, a highlight band can be translucent and the color thereof can match the selection color in the Functions List window 510. A combination of pattern and color may also be used.

Figure 8:
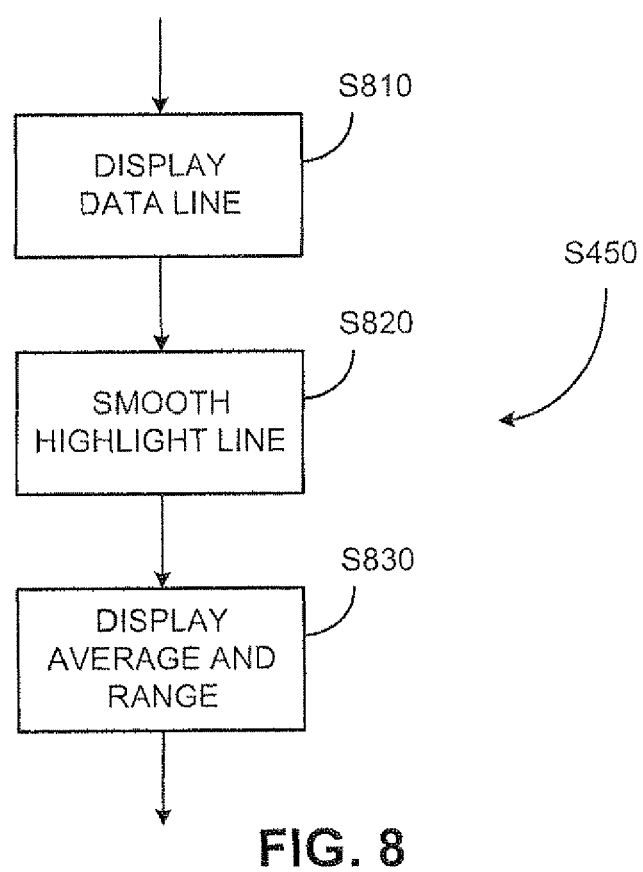
FIG. 8 shows an illustrative non-limiting method of displaying function graphs of functions.

FIG. 8 shows a non-limiting illustrative example method to perform step S450 of displaying the selected function in the Function Graph window 520. In the method, the display controller 310 controls the display of the data line in step S810. In step S820, the processor 320 smoothes the highlight band based on the data line, and the smoothed highlight band is displayed under the control of the display controller 320. Smoothing improves the readability of the graph by minimizing the perceived noise, while still displaying the unaltered profile data.

Figure 9:
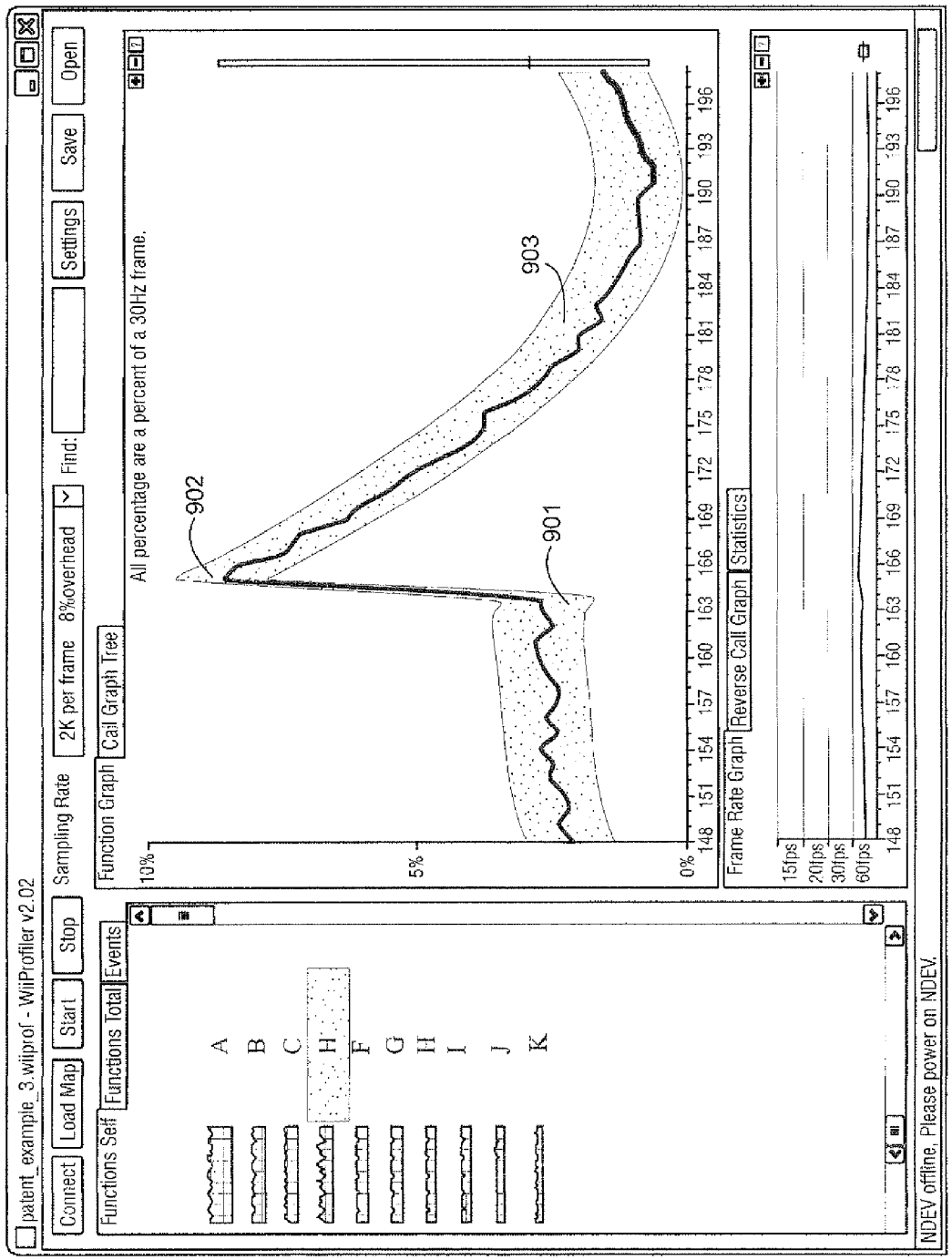
FIG. 9 shows an illustrative non-limiting graph of a smoothing applied to a highlight band.

In a non-limiting illustrative implementation, smoothing is performed so that the highlight band does not track the data line exactly, but rather follows a moving average or some other moving statistics (median, mode, etc.) of the data line. However, when there are any abrupt changes in the data line, the highlighted line tracks exactly or substantially exactly the data line at those abrupt changes as shown in FIG. 9. As seen, the highlight band tracks the moving average of the data line up until the point 901 at which the data line of the function "H" abruptly changes from roughly 3% at frame 164 to 9% at frame 165. The abrupt change in this instance is beyond the margin of error (about 2%) of the function. Between points 901 and 902, the highlight bands track the data lines exactly or substantially exactly. In this way, the data line is kept within the highlight band. After the point 902, the data line again resumes tracking the moving average of the data line.

This particular smoothing can be described as follows. The highlight band tracks the moving statistic, e.g., the moving average, within a predetermined window (e.g., 5 consecutive frames) when a change in the data line within the predetermined window is within a predetermined percentage of the margin of error. When the change is greater than the predetermined percentage, the highlight band tracks the data line exactly or substantially exactly. One benefit of this type of smoothing is that the highlighting stays on the original data line, suggesting an average where the statistical noise is within the margin of error, but tracks the line substantially perfectly when the data line is perceived to be outside the margin of error, e.g., when the data line drops or rises perceptually. This type of smoothing keeps the highlight band on the data line.

Figure 10A:
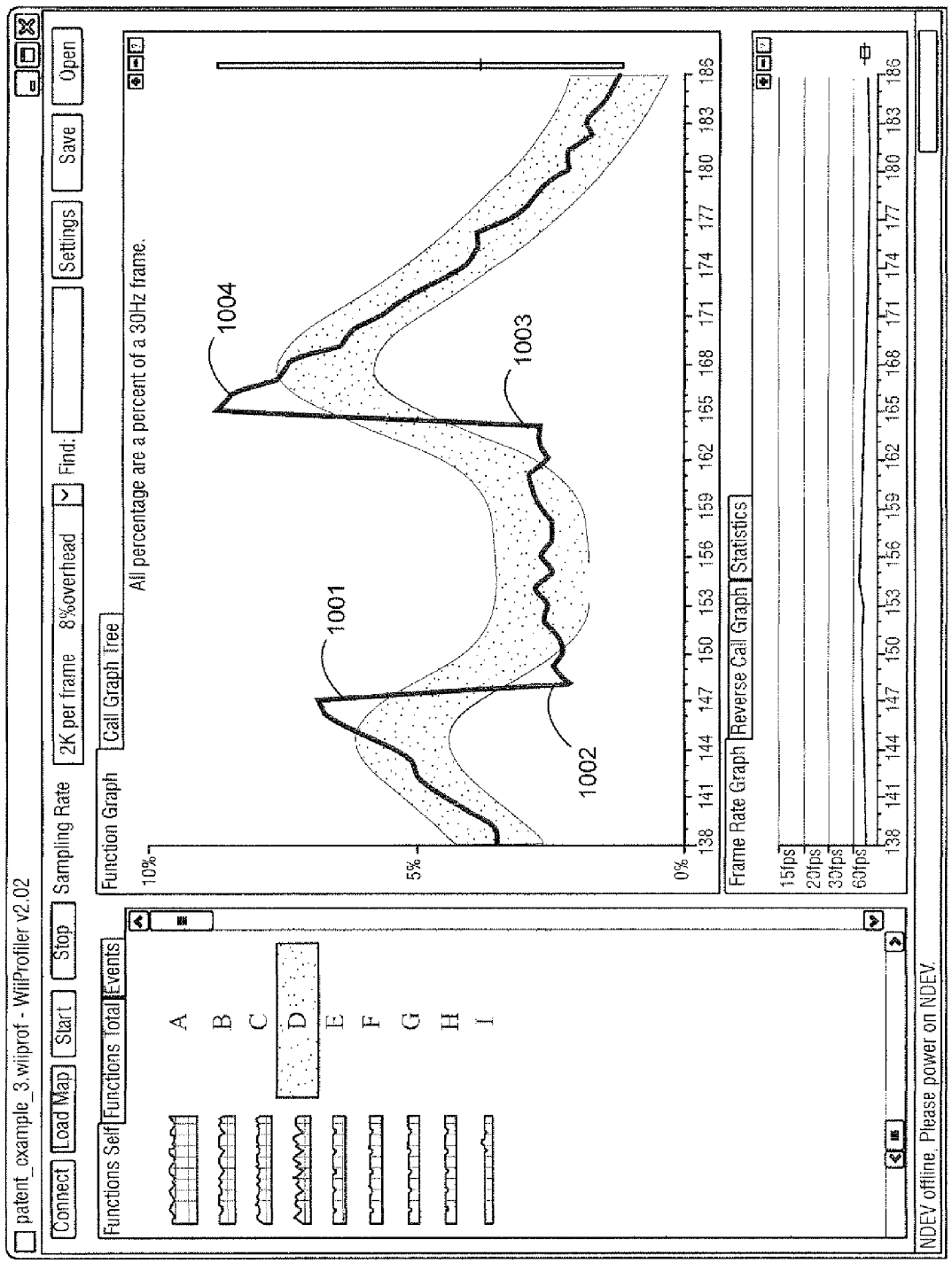
FIGS. 10A-10E show illustrative non-limiting graphs of highlight bands of functions with and without the smoothing applied.
Figure 10B:
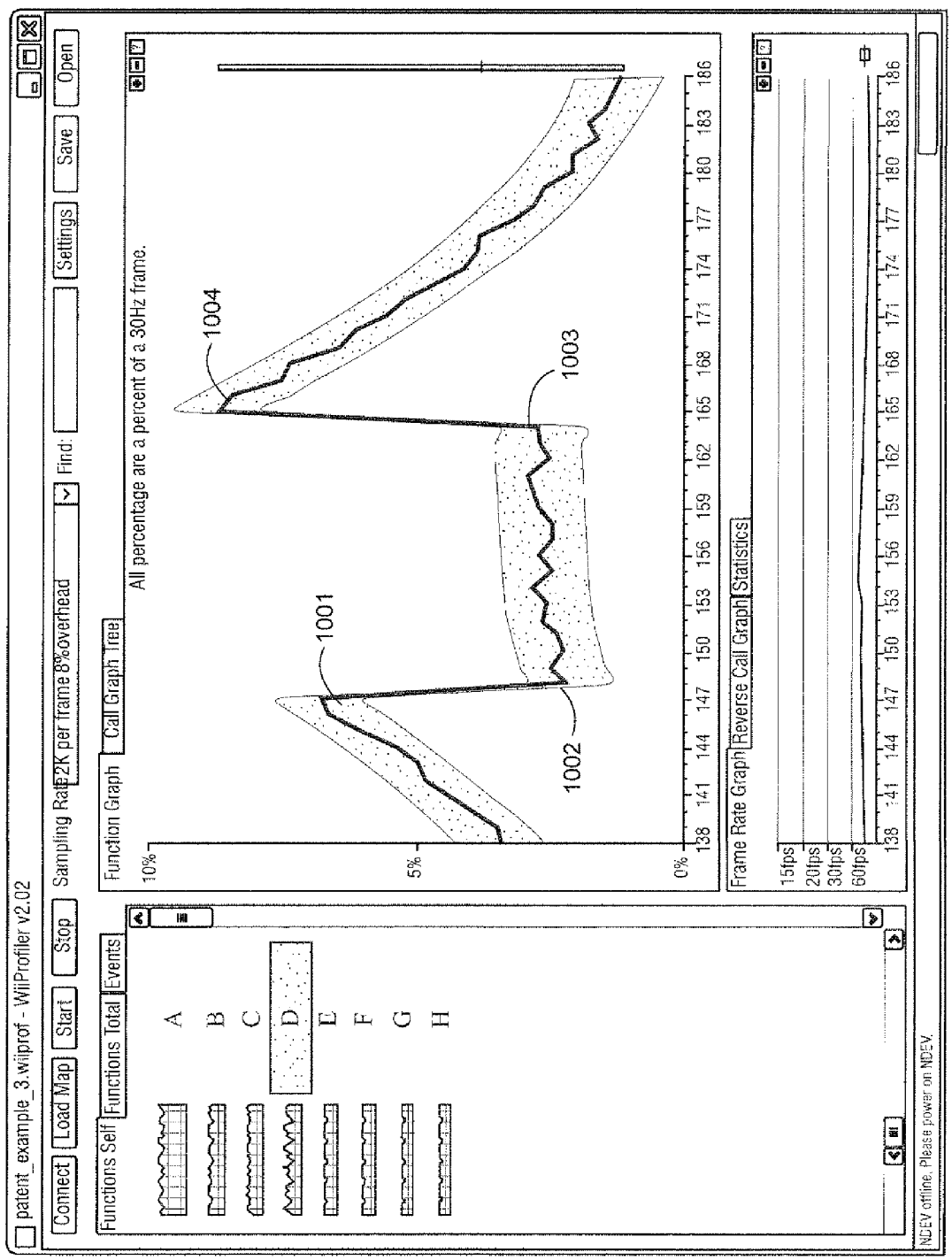

For an illustration, FIGS. 10A and 10B are provided. FIG. 10A shows a naïve implementation of a smoothing algorithm without taking into the account abrupt changes at key points and FIG. 10B illustrates the result of the smoothing taking into account the abrupt changes at the same key points. It is seen that accounting for the abrupt changes—by keeping the highlight band on the data line—improves the overall readability.

Figure 10C:
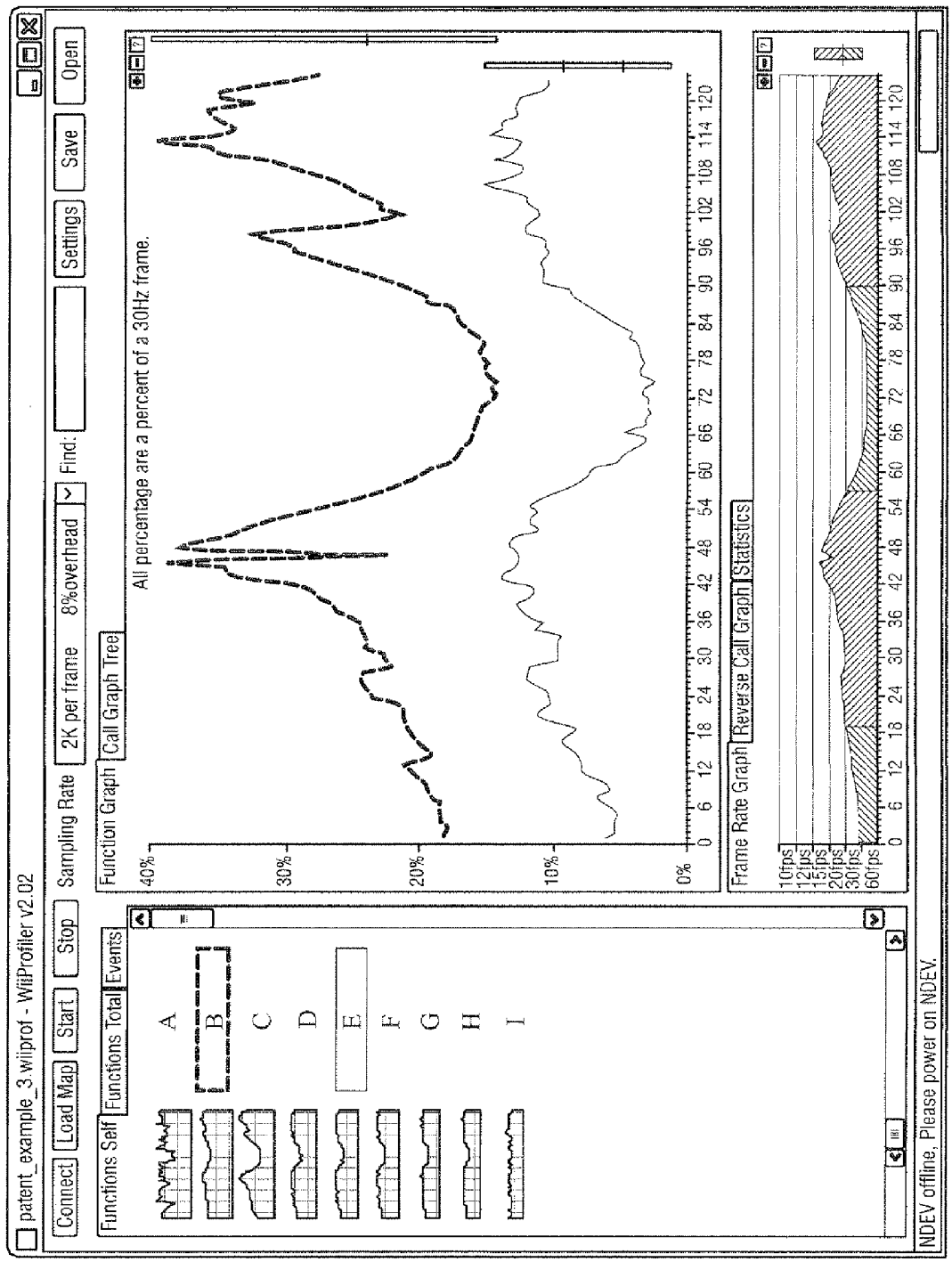
Figure 10D:
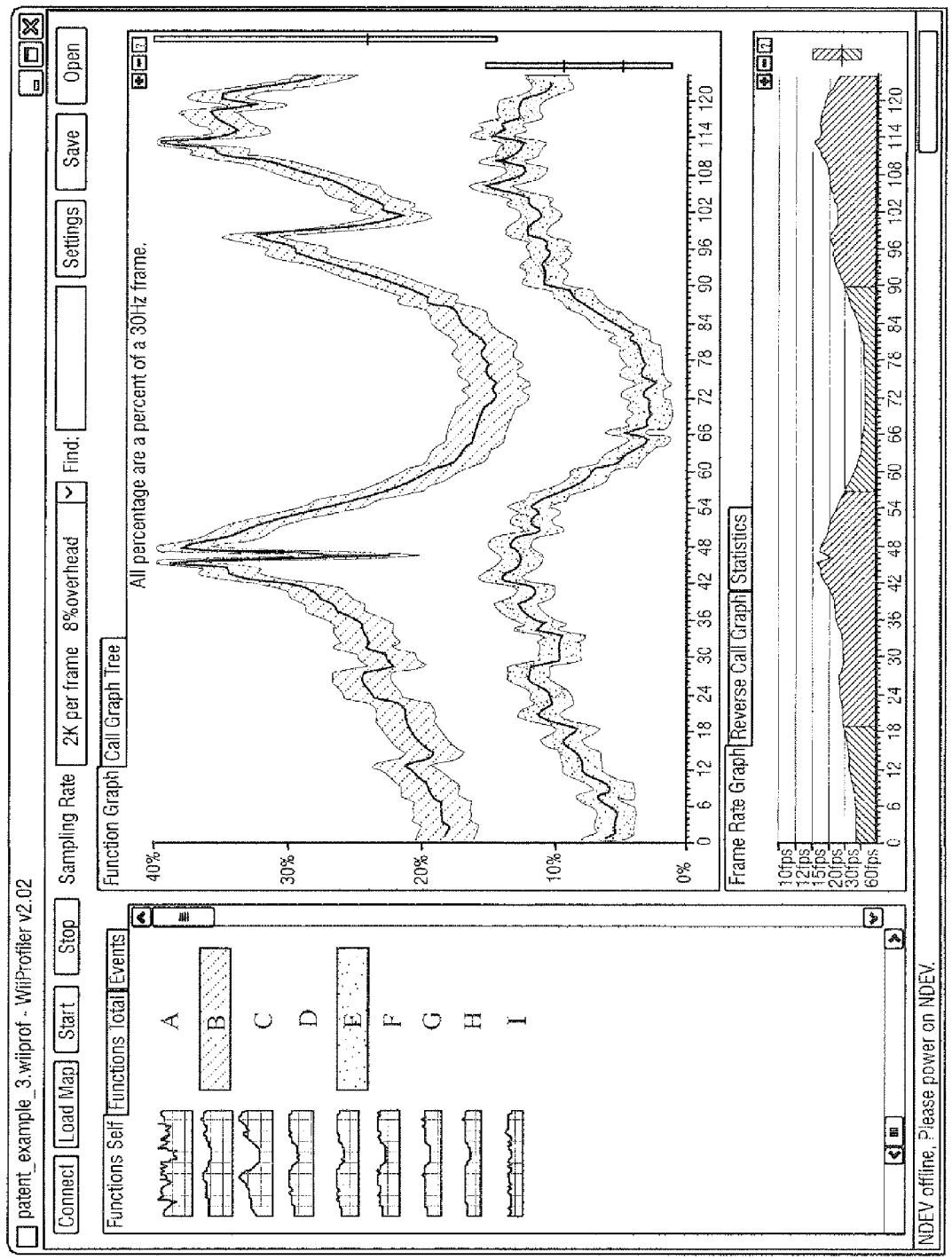
Figure 10E:
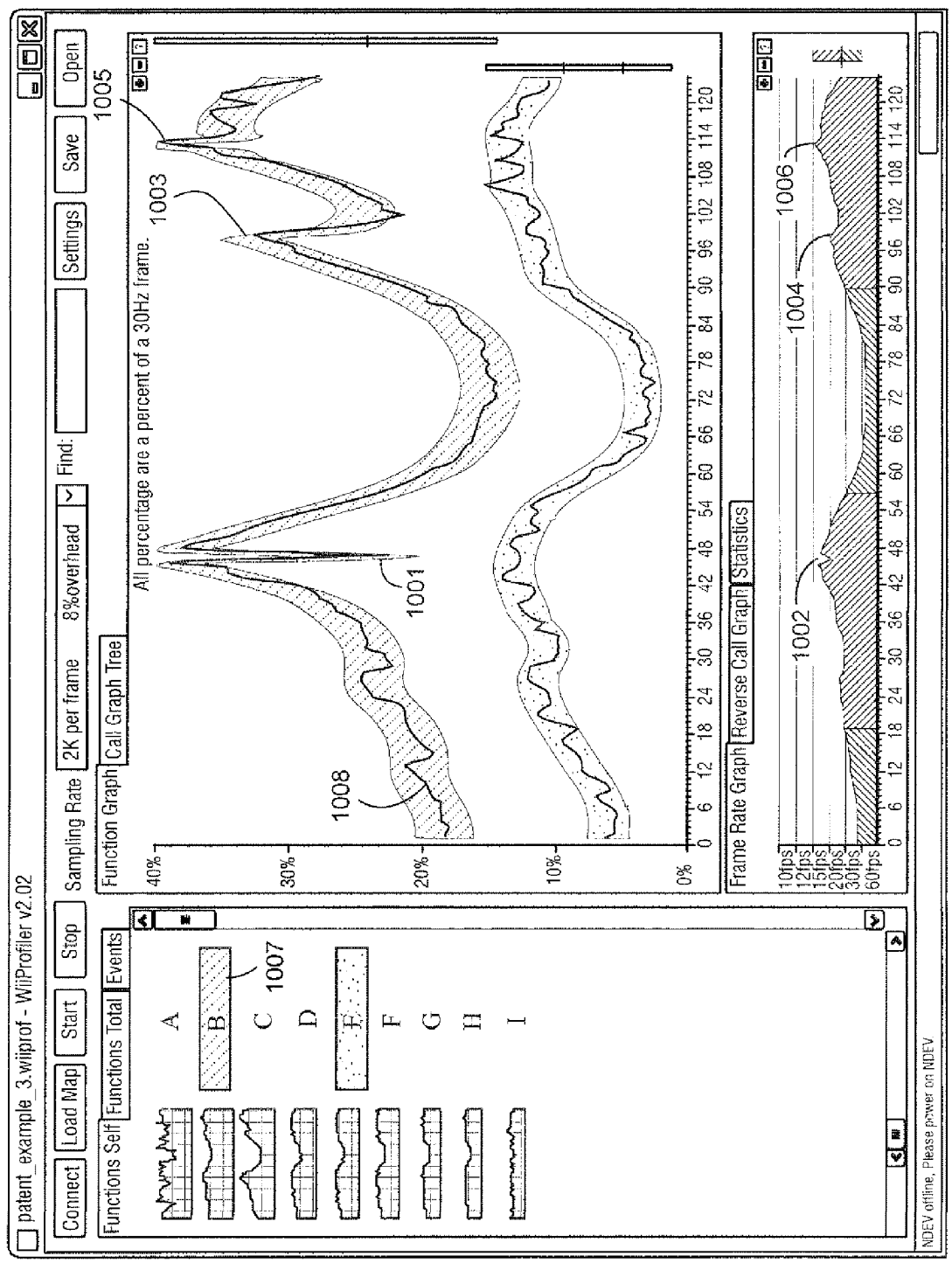

As a further illustration, FIGS. 10C, 10D and 10E are also shown. In FIG. 10C, only the data lines are drawn. In FIG. 10D, the highlight bands track the data lines perfectly always (opposite of FIG. 10A). In FIG. 10E, smoothing taking the abrupt changes into account is implemented (similar to FIG. 10B). It is seen that tracking the highlight band with smoothing improves the readability of the function graphs by minimizing the perceived noise, while still displaying the unaltered profile data.

Figure 11:
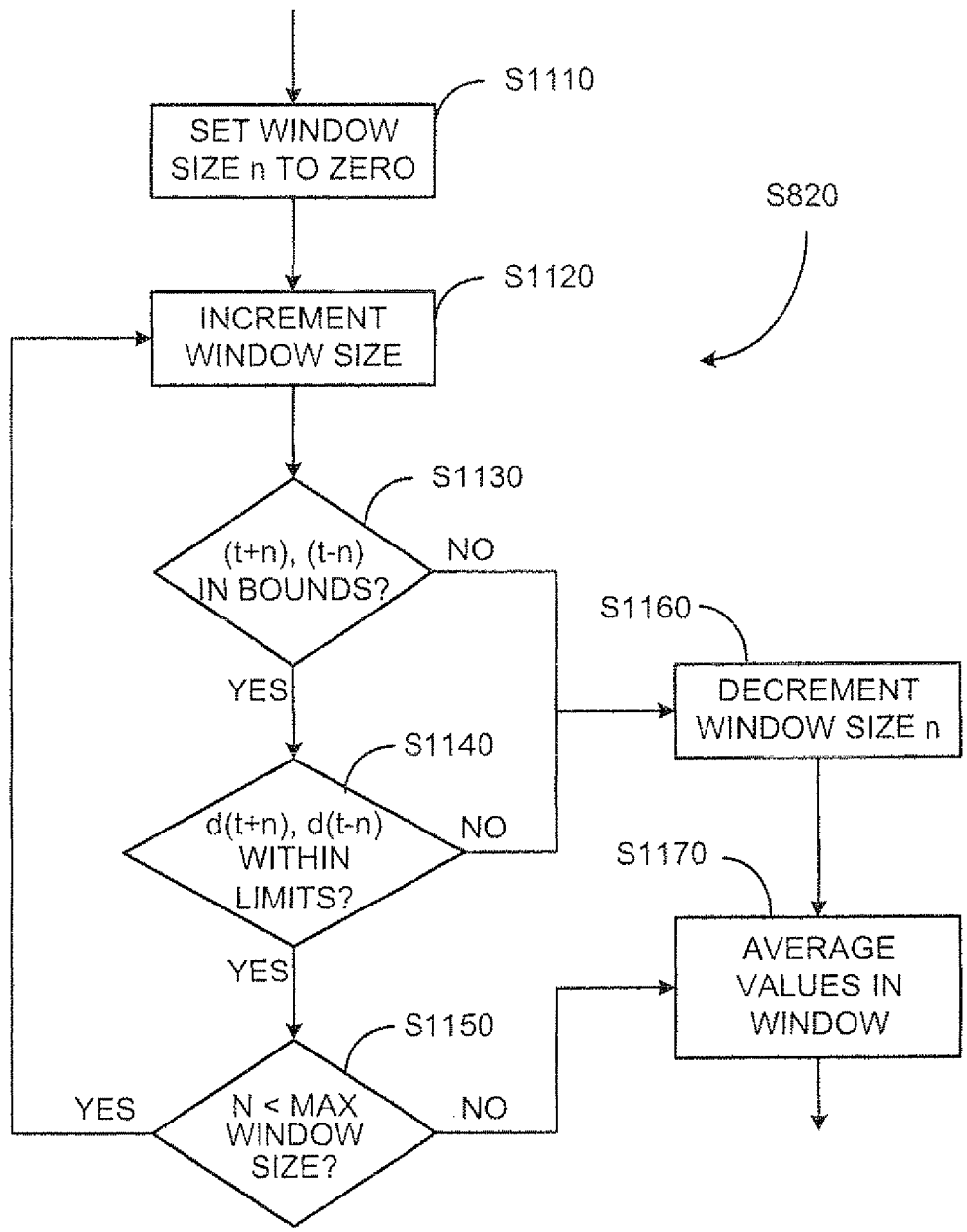
FIG. 11 shows an illustrative non-limiting method of smoothing the highlight bands.

FIG. 11 shows a non-limiting illustrative method to implement step S820 of smoothing the highlight band with abrupt changes taken into account. In this method, for every time "t" in the data line, the processor 320 analyzes n values to the left and right of the current value. For example, if n=2, then values {d(t−2), d(t−1), d(t), d(t+1), d(t+2)} in the data line are analyzed. These values create a moving window of size 2n+1 centered on the current time t.

Specifically, in the method, the processor 320 performs a first step S1110 of setting a window size parameter n=0. Thus, initially the window only contains the single initial data line value at time t (i.e., d(t)). In the second step S1120, the processor 320 increments the window size parameter n, e.g., by 1. In the third step S1130, the processor 320 determines whether the moving window of size 2n+1 centered on the current time t lies within the bounds of the data line. For example, the very first data (i.e., d(0) the value at the very first frame in the profile data) would not have a previous data. When the moving window lies within the data line bounds, the processor 320 proceeds to the fourth step S1140. When the moving window does not lie within the bounds, the processor 320 proceeds to the sixth step S1160.

In the fourth step S1140, the processor 320 determines whether any consecutive values at the left or right edge of this moving window differ by more than the predetermined percentage of the margin of error, e.g., beyond two standard deviations. That is, it is determined whether a first difference d(t+n)−d(t) or a second difference d(t−n)−d(t) is within the predetermined percentage. When the first and second differences are within the predetermined percentage, the processor 320 proceeds to the fifth step S1150. Otherwise, the processor 320 proceeds to the sixth step S1160.

In the fifth step S1150, the processor 320 determines whether the window size parameter n is less than a predetermined maximum window size parameter. That is, it is determined whether n is at the largest allowed size for the moving window. If n is less than the maximum (i.e., the maximum window size has not yet been reached), the processor 320 proceeds to the second step S1120 to increment the window size parameter n. If the maximum window size has been reached, then the processor 320 proceeds to the seventh step S1170.

In the sixth step S1160, the processor 320 decrements the window size parameter n and proceeds to the seventh step S1170 where the processor 320 averages the data values within the moving window. As mentioned above, other statistical values such as median, mode, etc. of the data values within the moving window can be determined in step S1170. In this particular implementation, since the data lines represent performance values at each frame, frame numbers can be used as the time values "t".

Referring back to FIG. 8, the method to implement step S450 of displaying the selected function continues in which the processor 320 calculates statistical values such as the average, mode, median, and range of each selected function for a portion of the corresponding function graph in the Function Graph window 520, and the display controller 310 controls the display thereof in step S830. Reader should note that the average and range calculated in step S830 are not the same as the moving average determined for smoothing purposes and thus should not confuse them with each other.

Figure 12:
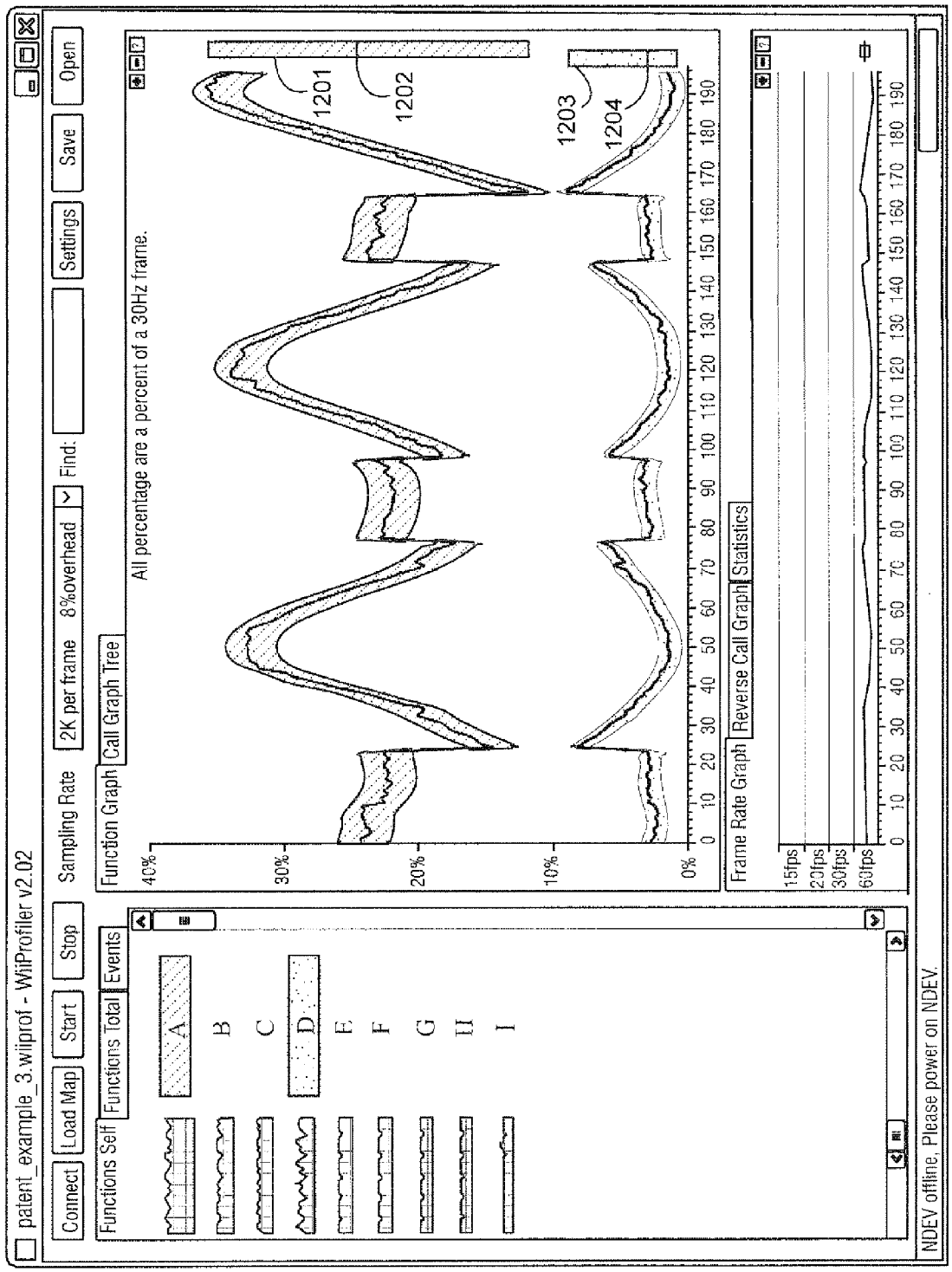
FIG. 12 shows an illustrative non-limiting graph of range and average values of displayed function graphs.

FIG. 12 is provided for illustration purposes. For any particular zoom level in the Function Graph window, it can be very helpful to know the statistical values such as range and average of the data lines for the portion of the function graph of corresponding functions currently shown. In FIG. 12, the ranges 1201, 1203 for function graphs of functions "A" and "D" are depicted as vertically oriented bars at the far right side of the corresponding function graph in the Function Graph window. Each range 1201, 1203 is represented as a bar that spans the distance from the lowest to the highest data line values in the portion of the function graph displayed, which, in this particular instance includes frames 0 to 196. Thus, the range 1201 and the average 1202 indicate that the data line for function "A" ranged from about 12% to about 38% and averaged about 27% between frames 0 to 196.

Each bar is visually correlated with the highlight band of the function graph (and thus also with the selected function in the Functions List window). As an example, the bars can be textured or colored in a same or similar way to the highlight band. The average values 1202, 1204 are depicted as horizontal lines over the vertical range bars 1201, 1203. While not shown, other statistical values such as mode and median can also be displayed.

Figure 13:
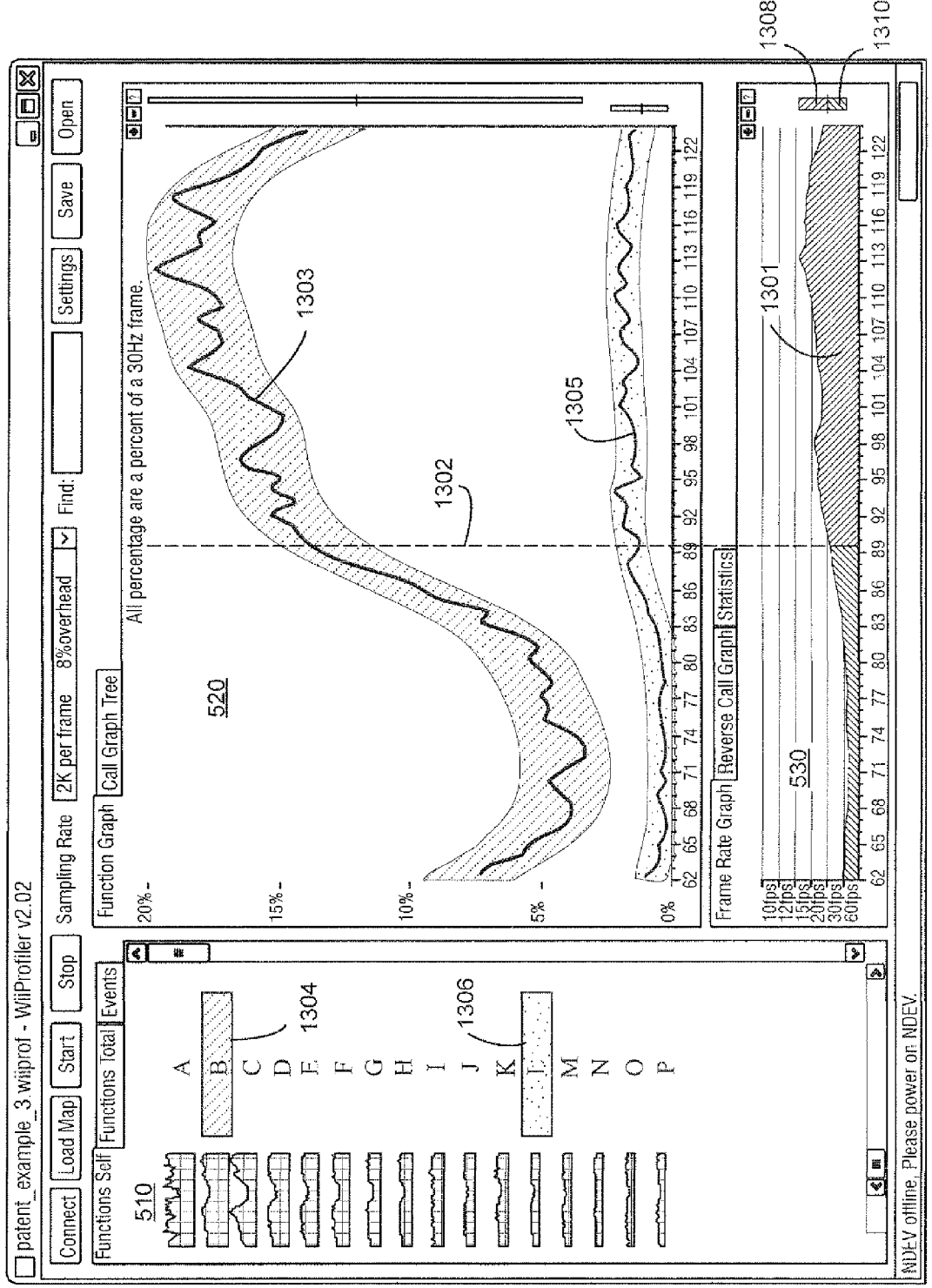
FIG. 13 shows an illustrative non-limiting graph displaying a correspondence between the frame rate graph and the function graph.

Referring back to FIG. 4, in step S430, the processor 320 determines instantaneous frame rates and the display controller 310 displays a graph of the instantaneous frame rates in the Frame Rate Graph window 530 of the display. The graph of the instantaneous frames rate is displayed in a corresponding 1:1 manner to the Function Graph window 520, as shown in FIG. 13. The X-axis scales are the same for both the Frame Rate Graph window 530 and the Function Graph window 520 and represent frames 62 to 124 of the profile data in this particular instance. The Y-axis of the Frame Rate Graph window 530 is the instantaneous frame rate (or simply "frame rate"), which is one example of the performance criteria in video games.

While instantaneous frame rate is used in this particular non-limiting illustration, other parameters, e.g., processor utilization, can be used as the measurement of performance of the video game. Thus, the Frame Rate Graph window 530 can be generalized to be Performance Graph window 530 which displays a performance graph of instantaneous performance values of the video game program.

As seen, relative to the function "B" 1304 performance as depicted by the data line 1303 in the Function Graph window 520, another graph relating the frame rate 1301 of the video game is graphed in the Performance Graph window 530 in a corresponding 1:1 manner in relation to frame numbers, i.e., in time. This relates to how the performance of a particular function might coincide with a decline in the frame rate, i.e., decline in the overall performance, of the video game. In FIG. 13, the frame rate drops from 30 fps to 20 fps at time point 1302 which corresponds frame 90. This drop in the frame rate can be visually seen to coincide when the data line 1303 of the function 1304 reaches approximately 15%, indicating that the function 1304 could be responsible for the decline in the frame rate, whereas the data line 1305 of the function 1306 does not vary much during the decline in the frame rate at point 1302.

In FIG. 13, the graph of the instantaneous frame rate visually changes—from light to dark—at point 1302 when the frame rate drops below 30 fps. Such change in the display provides a visual alert to the developer when the video game's performance, e.g., the instantaneous frame rate, drops below a predetermined performance value. Such visual queues can be provided through changes in color, changes in pattern, changes in the combination thereof, etc. For example, the frame rates that below the predetermined performance value may be deemed "unacceptable" and colored in red while the rest may be "acceptable" and colored in green. Of course, the frame rates (i.e., performance values) can be divided into three or more categories (e.g., good, acceptable, bad) with corresponding visual queues (e.g., green, yellow, red).

In addition to the instantaneous frame rates, a frame rate range 1308 and an average frame rate line 1310 are provided at the right side of the Frame Rate Graph window 530. The range 1308 and the average 1310 (or some other statistical values such as median, mode, etc.) serve purposes similar to the ranges and averages for data lines displayed in the Frame Graph window 520. The range bar 1308 can be drawn to visually distinguish the different frame rate categories.

FIG. 10E provides a further illustration of the usefulness of the performance graph such as the instantaneous frame rate graph. As seen, the graph of the instantaneous frame rates provides visual queues as to when the frame rate drops below the predetermined rate or performance value. The developer may be guided to investigate the function 1007 for optimization by noting coincidences of sharp rises and drops of the data line 1008 with the changes in the instantaneous performance values. For example, sudden drops and rises 1001, 1003 and 1005 appear to coincide with spikes and valleys 1002, 1004 and 1006 of the instantaneous frame rate graph. Again, the instantaneous frame rate is merely an example and the concept can be generalized to include many number of performance measurement parameters.

Figure 14:
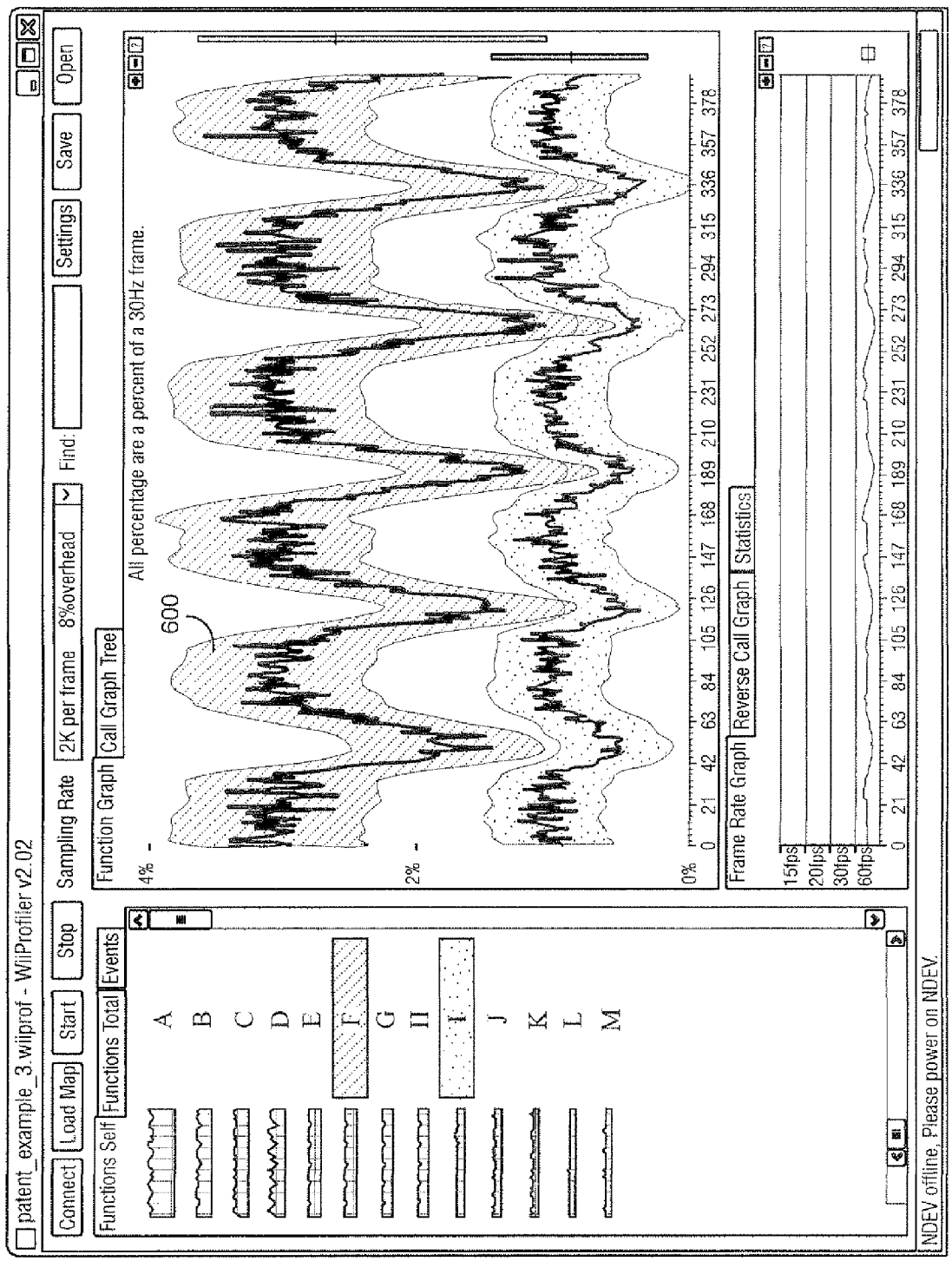
FIG. 14 shows an illustrative non-limiting graph displaying non-linear scaling.

Referring back to FIG. 4, when the user input is received to non-linearly scale the display in step S460, the processor 320 performs the non-linear scaling along an X-axis scale within the Function Graph window, and the result is displayed under the control of the display controller 310 as illustrated in FIG. 14. Within the function graph of a function, a scroll wheel of the mouse or other possible combinations of buttons and keys can allow zooming in and out of the function along the X-axis only, centered around the current mouse position or a chosen area of interest. The graph in FIG. 14 can be zoomed out to see the entire collected data lines. Compare this to e.g., FIG. 5, in which the graph is zoomed in to see detail in one particular area. To scroll horizontally within the function data, a user can simply click and drag with the mouse as an example. Note that when the non-uniform scaling is performed in the Function Graph window, the Performance Graph window is also scaled accordingly so that the 1:1 correspondence is maintained.

While the description provided above use the profile of data collected through a statistical profiler from a video game program, the disclosed technology is not so limited. For example, sampled data from an instrumenting profiler or other statistical collection process may be used. Further, any type of sampled data may be used for visually and interactively manipulating purposes. For example, performance of a stock market such as Dow Jones™ or NASDAQ™ can be viewed to determine which component stock or stocks may be of interest for detailed analysis. In another example, a manufacturer of a widget may use one or more embodiments of the disclosed technology to determine which of the widget manufacturing processes significantly impacts the overall manufacturing efficiency.

One of many benefits of the disclosed technology is that the profile data can be transformed into meaningful visual information. This allows the user to quickly and efficiently determine which of the underlying components that contributes to the profile have significant impact on the system as a whole. This allows the user to visually analyze the dynamic behavior of the system and identify areas of optimization that will have the greatest return. A non-exhaustive list of advantages include the following:

Each mini-graph effectively provides a preview of the function in a very small footprint allowing the user to quickly determine which function or functions may be of interest without the need to select individual functions one-by-one.

Each function graph effectively conveys the margin of error and variability associated the function. Highlight band smoothing effectively suppresses noise and provides visual correlation with the selected function.

The frame rate graph allows correlation between individual functions and the overall performance to be easily determined.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

For purposes of explanation and not limitation, specific details are set forth such as particular architectures, interfaces, techniques, and so on. However, it will be appreciated that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, block diagrams herein can represent conceptual views of illustrative circuitry embodying principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

Functions of various elements including functional blocks labeled or described as "processors" or "controllers" may be provided through dedicated hardware as well as hardware capable of executing associated software. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

We claim:

1. For use with a video game console of a type that is responsive to a handheld controller input to execute a video game program and provide interactive animated displays, a method of collecting and transforming profile data of performance measurements from the video game program and visualizing and interactively manipulating the transformed data to visually present a dynamic behavior of the video game program that shows correlation of impacts that functions have on performance of the executing video game program, the method comprising:

collecting the profile data;

displaying, by a profile analyzer, a list of one or more functions of the video game program in a Functions List window of a display device based on the profile data, each displayed function in the Functions List window being user selectable, the profile analyzer being implemented at least in part in hardware;

receiving user input selecting a function from the Functions List window; and displaying, by the profile analyzer, a function graph of the selected function in a Function Graph window of the display device based on the profile data, wherein the Function Graph and the Functions List windows are separate windows and are simultaneously displayed on the display device, and wherein the function graph includes a data line and a highlight band tracking the data line, the data line representing a graph of instantaneous performance values of the selected function, a thickness of the highlight band representing a margin of error of the selected function, and the highlight band being simultaneously displayed with and surrounding the data line.

2. The method of claim 1, wherein the step of displaying the list of one or more functions in the Functions List window comprises:

generating a mini-graph for each function based on the profile data, each mini-graph being a graph of the corresponding function's performance over a duration of the profile data; and displaying the mini-graph in the Functions List window within a predetermined area footprint.

3. The method of claim 2, wherein the step of generating the mini-graph for each function comprises generating each mini-graph using non-linear scaling.

4. The method of claim 3, wherein the step of generating the mini-graph for each function comprises generating each mini-graph using exponential scaling.

5. The method of claim 1, wherein the step of displaying the function graph of the selected function comprises visually correlating the highlight band in the Function Graph window with the selected function in the Functions List window.

6. The method of claim 1, wherein in the step of displaying the function graph of the selected function comprises:
displaying the data line; and
smoothing the highlight band based on the data line such that the highlight band is on the data line.

7. The method of claim 6, wherein the step of smoothing the highlight band comprises tracking a moving average of the data line within a predetermined window when a change in the data line within the predetermined window is within a predetermined percentage of the margin of error, and tracking the data line substantially exactly otherwise.

8. The method of claim 6, wherein the step of smoothing the highlight band comprises:
(1) setting a window size parameter n=0;
(2) incrementing the window size parameter n=n+1;
(3) determining whether a moving window of size 2n+1 centered on a current time t lies within data line bounds of the profile data and proceeding to (4) when the moving window lies within the data line bounds and proceeding to (6) otherwise;
(4) determining whether either a first difference of data values d(t+n)−d(t) or a second difference d(t−n)−d(t) of the data line is within a predetermined margin of error percentage and proceeding to (5) when both first and second differences are within the predetermined margin of error percentage and proceeding to (6) otherwise;
(5) determining whether the window size parameter n is less than a predetermined maximum window size parameter and proceeding to (2) when the window size parameter n is less than the predetermined maximum window size parameter and proceeding to (7) otherwise;
(6) decrementing the window size parameter; and
(7) averaging the data values within the window of size 2n+1 centered on the current time t.

9. The method of claim 1, further comprising displaying a graph representing range and average performance values for the data line of the selected function for a portion of the corresponding function graph currently displayed in the Function Graph window based on the profile data.

10. The method of claim 9, wherein the graph representing the range and average performance values is simultaneously displayed with and is visually correlated to the corresponding function graph.

11. The method of claim 1, further comprising displaying, in a Performance Graph window of the display device, a performance graph of instantaneous performance values of the video game program based on the profile data,
wherein the Performance Graph window is separate from the Functions List and the Function Graph windows and is simultaneously displayed with the Functions List and the Function Graph windows.

12. The method of claim 11, further comprising displaying the performance graph to visually alert the user when the performance graph drops below a predetermined instantaneous performance value.

13. The method of claim 11, further comprising:
scaling the Function and Performance Graph windows so that X-axis scales of the Function and Performance Graph windows correspond one-to-one to each other;
receiving a user input for non-linear scaling; and
performing non-linear scaling along the X-axis scales of the Function and Performance Graph windows in response to the user input while maintaining the one-to-one correspondence.

14. The method of claim 11, wherein
the performance graph in the Performance Graph window is a graph of an instantaneous frame rate of the video game program at each frame of the profile data, and
the selected function's data line in the Function Graph window represents a percentage of a frame time spent executing the function at each frame of the profile data.

15. The method of claim 1, further comprising:
identifying one or more functions of the video game program for modification based on the dynamic behavior of the video game program visually presented in the Functions List window and/or the Function Graph window; and
modifying the identified function(s) to optimize the performance of the video game program.

16. A profile analyzer structured to transform profile data of performance measurements from a video game program to visually present a dynamic behavior of the video game program, the analyzer comprising:
a processor, a memory, and a display controller,
wherein the processor, in conjunction with the memory, is structured to process the profile data received from a profiler,
wherein the display controller is to control a display device to display
a list of one or more functions of the video game program in a Functions List window of the display device based on the profile data analysis, each displayed function in the Functions List window being user selectable, and
a function graph of a user selected function in a Function Graph window of the display device based on the profile data analysis,
wherein the Function Graph and the Functions List windows are separate windows and are simultaneously displayed on the display device, and
wherein the function graph includes a data line and a highlight band tracking the data line, the data line representing a graph of instantaneous performance values of the selected function, a thickness of the highlight band representing a margin of error of the selected function, and the highlight band being simultaneously displayed with and surrounding the data line.

17. The analyzer of claim 16, wherein
the processor is structured to generate a mini-graph for each function based on the profile data, each mini-graph being a graph of the corresponding function's performance over a duration of the profile data, and
the display controller is structured to control the display device to display the mini-graph in the Functions List Window within a predetermined area footprint.

18. The analyzer of claim 17, wherein the processor is structured to perform non-linear scaling to generate each mini-graph.

19. The analyzer of claim 18, wherein the processor is structured to perform exponential scaling to generate each mini-graph.

20. The analyzer of claim 16, wherein the display controller is structured to control the display device to display the function graph of the selected function to visually correlate the highlight band in the Function Graph window with the selected function in the Functions List window.

21. The analyzer of claim 16, wherein
the processor is structured to smooth the highlight band based on the data line such that the highlight band is on the data line, and the display controller is structured to control the display device to display the data line and the smoothed highlight band.

22. The analyzer of claim 21, wherein in the processor is structured to smooth the highlight band so that the highlight band tracks a moving average of the data line within a predetermined window when a change in the data line within the predetermined window is within a predetermined percentage of the margin of error and tracks the data line substantially exactly otherwise.

23. The analyzer of claim 21, wherein the processor is structured to:
(1) set a window size parameter n=0;
(2) increment the window size parameter n=n+1;
(3) determine whether a moving window of size 2n+1 centered on a current time t lies within data line bounds of the profile data and proceed to (4) when the moving size lies within the data line bounds and proceed to (6) otherwise;
(4) determine whether either a first difference d(t+n)−d(t) or a second difference d(t−n)−d(t) of the data line is within a predetermined margin of error percentage and proceed to (5) when both first and second differences are within the predetermined margin of error percentage and proceed to (6) otherwise;
(5) determine whether the window size parameter n is less than a predetermined maximum window size parameter and proceed to (2) when the window size parameter is less than the predetermined maximum window size parameter and proceed to (7) otherwise;
(6) decrement the window size parameter n=n−1; and
(7) average the data values within the window of size 2n+1 centered on the current time t.

24. The analyzer of claim 16, wherein
the processor is structured to determine average performance values of the data line of the selected function for a portion of the corresponding function graph displayed in the Function Graph window, and
the display controller is structured to control the display device to display a graph representing the range and average performance values.

25. The analyzer of claim 24, wherein the display controller is structured to such that the graph representing the range and average performance values is simultaneously displayed with and is visually correlated to the corresponding function graph.

26. The analyzer of claim 16, wherein
the processor is structured to generate a performance graph of instantaneous performance values of the video game program, and
the display controller is structured to control the display device to display the performance graph in a Performance Graph window of the display device,
wherein the Performance Graph window is separate from the Functions List and the Function Graph windows and is simultaneously displayed with the Functions List and the Function Graph windows.

27. The analyzer of claim 26, wherein
the processor is structured to determine whether or not the performance graph is below a predetermined instantaneous performance value, and
the display controller is structured to control the display device to visually alert the user when the processor makes the determination.

28. The analyzer of claim 26, wherein
the processor is structured to scale along X-axis scales of the Function and Performance Graph windows so that the X-axis scales of the Function and Performance Graph windows correspond one-to-one to each other and to non-linearly scale along the X-axis scales of the Function and Performance Graph windows in response to the user input while maintaining the one-to-one correspondence, and
the display controller is structured to control the display device to display the scaled function graphs in the Function Graph window and the scaled performance graph in the Performance Graph window.

29. The analyzer of claim 26, wherein
the performance graph in the Performance Graph window is a graph of an instantaneous frame rate of the video game program at each frame of the profile data, and
the selected function's data line in the Function Graph window represents a percentage of a frame time spent executing the function at each frame of the profile data.

30. For use with a video game console of a type that is responsive to a handheld controller input to execute a video game program and provide interactive animated displays, a method of collecting and transforming profile data of performance measurements from the video game program and visualizing and interactively manipulating the transformed data to visually present a dynamic behavior of the video game program that shows correlation of impacts that functions have on performance of the executing video game program, the method comprising:
collecting the profile data; and
displaying, by a profile analyzer, a function graph a function of the video game program selected by a user on a display device based on the profile data, the profile analyzer being implemented at least in part in hardware,
wherein the function graph includes a data line and a highlight band tracking the data line, the data line representing a graph of instantaneous performance values of the selected function, a thickness of the highlight band representing a margin of error of the selected function, and the highlight band being simultaneously displayed with and surrounding the data line.

31. The method of claim 30, wherein in the step of displaying the function graph comprises smoothing the highlight band such that the highlight band is always on the data line but does not always exactly track the data line.

32. The method of claim 31, wherein the step of smoothing the highlight band comprises tracking a moving average of the data line within a predetermined window when a change in the data line within the predetermined window is within a predetermined percentage of the margin of error, and tracking the data line substantially exactly otherwise.

33. The method of claim 30, further comprising scaling the function graph along an X-axis scale of the function graph in response to an input from the user requesting non-uniform scaling.

34. The method of claim 30, further comprising displaying a performance graph of instantaneous performance values of the video game program on the display device based on the profile data such that X-axis scales of the function graph and the performance graph correspond one-to-one to each other,
wherein the function graph is displayed in a window of the display device, the performance graph is displayed in a window of the display device separate from the window of the function graph, and the performance graph is simultaneously displayed with the function graph.

35. The method of claim 34, further comprising displaying the performance graph to visually alert the user when the performance graph drops below a predetermined instantaneous performance value.

36. The method of claim 30, further comprising:

displaying a graph representing range and average performance values for the data line of the selected function for a portion of the function graph currently being displayed based on the profile data, wherein the graph is simultaneously displayed with and is visually correlated to the function graph.

37. The method of claim 36, wherein the graph representing the range and average performance values is simultaneously displayed with and is visually correlated to the corresponding function graph.

38. The method of claim 30, further comprising:

displaying a list of one or more functions of the video game program based on the profile data, the selected function being selected by the user from the displayed list; and visually correlating the highlight band of the function graph with the selected function in the displayed list, wherein the function graph is displayed in a window of the display device, the list is displayed in a window of the display device separate from the window of the function graph, and the list is simultaneously displayed with the function graph.

39. The method of claim 38, wherein each function in the list is displayed as a mini-graph of a corresponding function's performance over a duration of the profile data, each mini-graph occupying a predetermined area footprint of the display device.

40. The method of claim 30, further comprising:

identifying one or more functions of the video game program for modification based on the dynamic behavior of the video game program visually presented in corresponding function graphs; and modifying the identified function(s) to optimize the performance of the video game program.

* * * * *